Aug. 25, 1942. W. S. SAUNDERS 2,294,002
CONTROL HANDLE
Filed Jan. 2, 1940 3 Sheets-Sheet 2
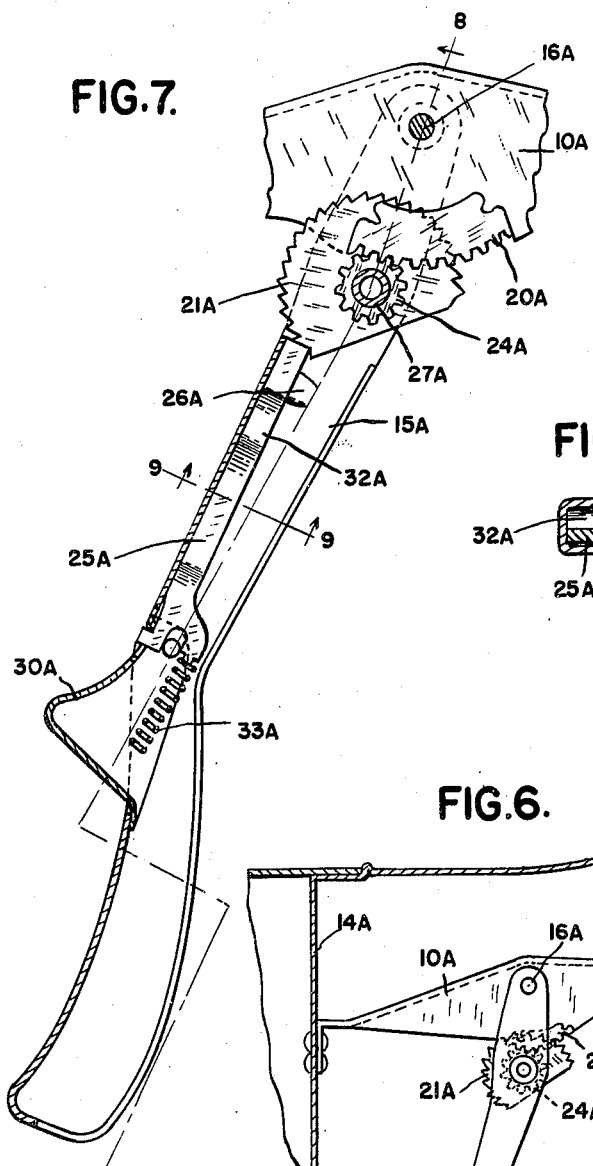
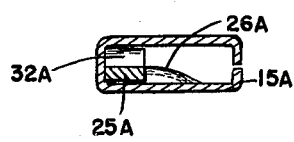
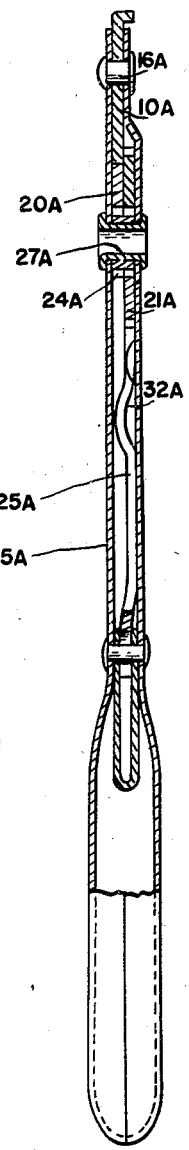
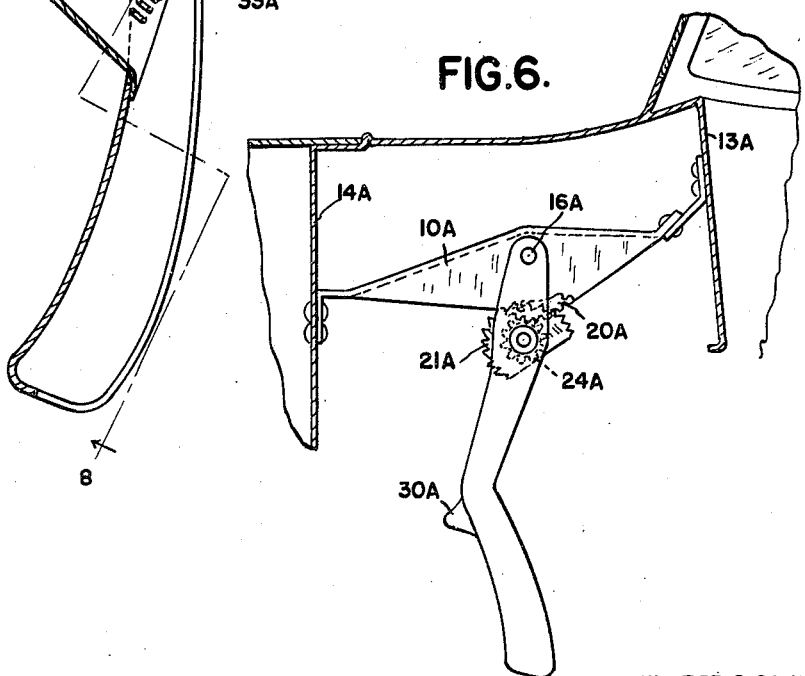
INVENTOR.
WALTER S. SAUNDERS
BY
ATTORNEYS

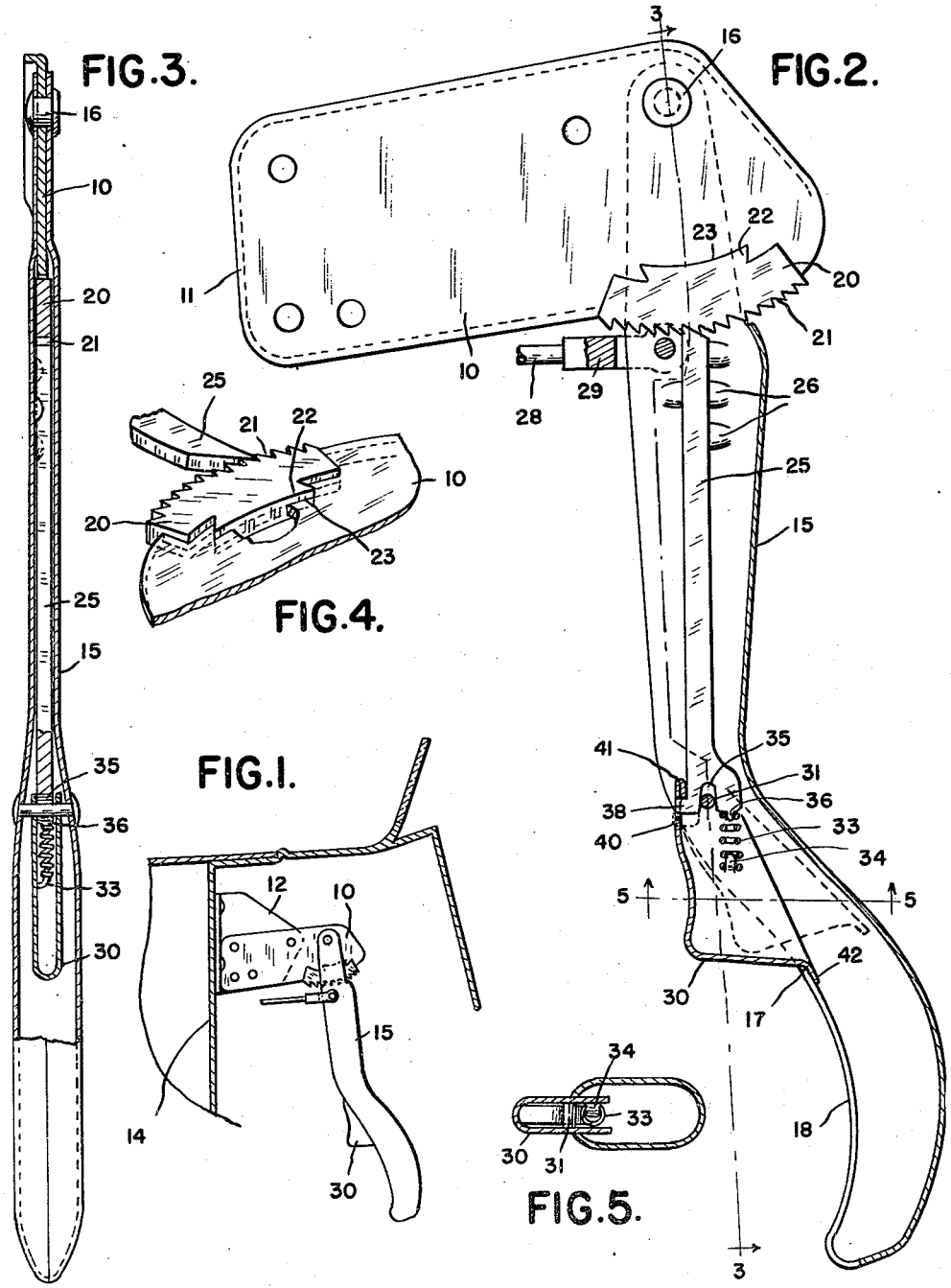

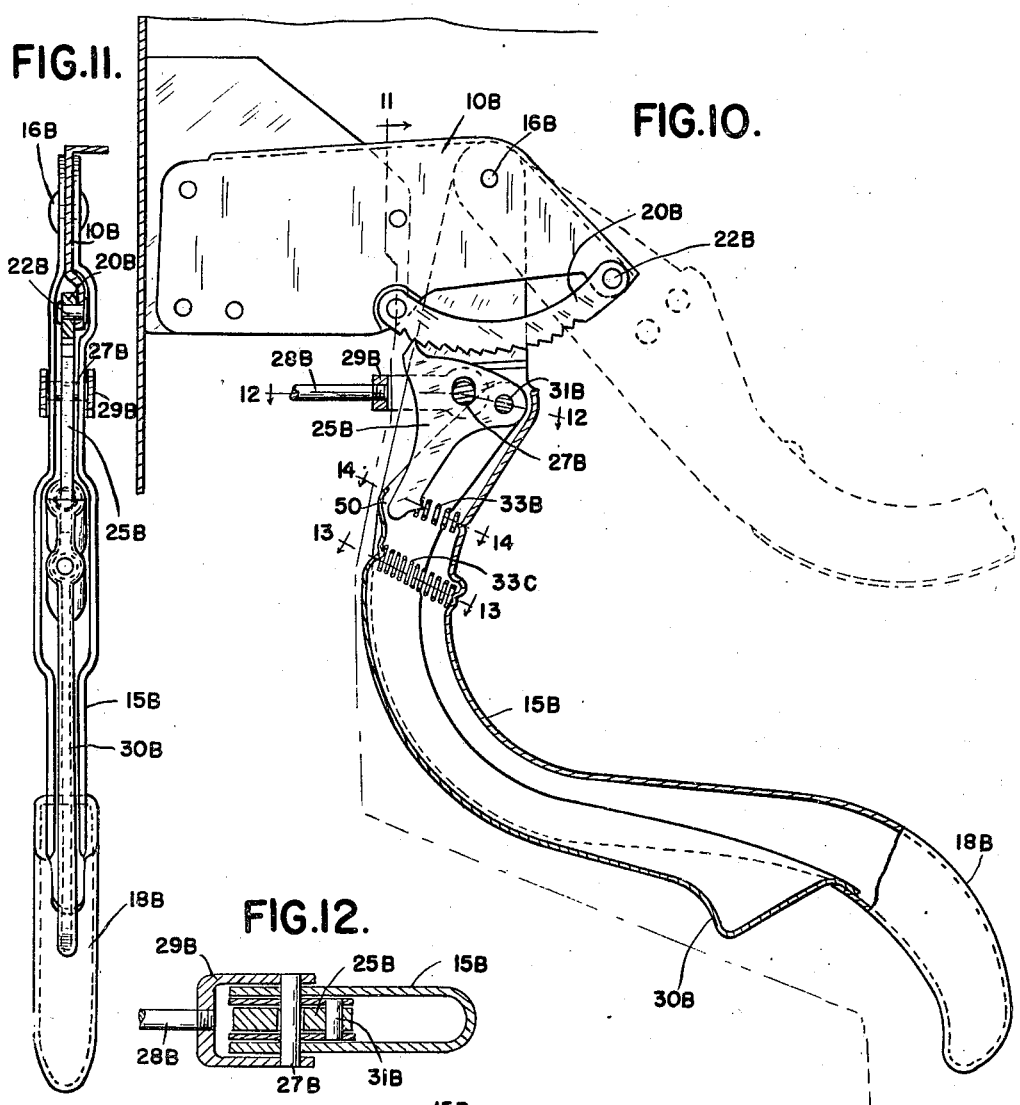

Patented Aug. 25, 1942

2,294,002

UNITED STATES PATENT OFFICE 2,294,002

CONTROL HANDLE

Walter S. Saunders, Pontiac, Mich., assignor to The American Forging & Socket Company, Pontiac, Mich., a corporation of Michigan Application January 2, 1940, Serial No. 312,029

8 Claims. (Cl. 74—538)

The present invention relates to lever-type operating handles, particularly for use in controlling the operation of the emergency brake systems of motor vehicles, although useful also in many other adaptations, as will readily be apparent to those skilled in the art.

Inasmuch as the evolution of the motor car has been such that the utmost economy and the lightest possible weight are now demanded in the construction of all accessory devices and appurtenances, sheet metal structures have come into wider use in all parts of the brake rigging and operating mechanism. Safety is the primary consideration in brake structures, however, and the problem of lightening the weight and decreasing the cost of brake operating mechanisms has resolved itself into one of simplification, elimination of parts by forcing one part to perform several functions, and mutual reinforcement of parts, by creation of self-bracing arrangements in which one part tends to reinforce or stiffen another.

The present invention aims to accomplish, to a greater degree than previously known devices, the aims outlined above, and to provide, in a simple, inexpensive construction, formed almost entirely of sheet metal, greater strength and rigidity in proportion to the weight of the assembly than has heretofore been possible.

A related object is the provision in such a device of an improved combined ratchet plate and supporting assembly, formed of sheet metal and in which the ratchet teeth are carried by a separate, hardened plate, thicker than the remainder of the assembly and keyed to the support and locked against displacement in a novel manner by the operating lever.

Another object is to incorporate in such a device a novel simplified unitary operating rod and pawl, and to provide improved and simplified means for actuating same in response to movement of a finger piece or other separately movable operating element.

Still another object is to provide improved spring means whereby the pawl and pawl-operating finger piece of such a brake lever may normally be maintained in holding position, and pressed together and against the supporting portions by which they are carried, to prevent all possibility of unwanted looseness and/or rattling.

Still another object is to provide, in such a lever-type brake operating assembly, improved means for multiplying the relative movement between the pawl and ratchet portions, the action of the parts being such as to give the effect of smaller ratchet teeth than are actually employed, whereby a very fine step-by-step action is achieved, despite the fact that the teeth are of relatively large size and great strength, to insure secure holding of the lever when the latter is in set position.

Still another object is to provide improved means for reducing the engagement pressure between the pawl and ratchet, thereby facilitating release of the pawl and operation of the lever.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a diagrammatic vertical sectional view of a portion of the body of a motor car, showing the dash panel and the manner in which my improved brake operating lever and cooperating ratchet mechanism are mounted thereupon.

Figure 2 is a vertical, longitudinal section of the mechanism, upon a larger scale.

Figure 3 is a view partly in section and partly in elevation, taken substantially on the line 3—3 of Figure 2, and looking in the direction of the arrows.

Figure 4 is a fragmentary detail perspective of the interengagement portions of the pawl, ratchet and supporting plate.

Figure 5 is a horizontal cross section, taken substantially on the line 5—5 of Figure 2, and looking in the direction of the arrows.

Figure 6 is a view similar to Figure 1, showing a somewhat modified construction.

Figures 7 and 8 are longitudinal sections of the modified construction, similar to Figures 2 and 3, respectively.

Figure 9 is a cross section taken substantially on the line 9—9 of Figure 7, and looking in the direction of the arrows.

Figure 10 is a sectional view, similar to Figure 2, of another somewhat modified construction, the hand lever being shown partly in elevation.

Figure 11 is a sectional view taken substantially on the line 11—11 of Figure 10, and looking in the direction of the arrows, showing the hand lever in elevation; and Figures 12, 13, and 14 are sectional views taken substantially on the lines 12—12, 13—13, and 14—14, respectively, of Figure 10, and looking in the direction of the arrows.

Referring now to the drawings, and first to the embodiment of Figures 1 to 4, inclusive, my improved operating mechanism will be seen to include a sheet metal supporting plate 10, adapted to be secured as by means of a bracket 12 to the dash 14 or other suitable supporting portion of the vehicle. The plate 10 is marginally flanged, as indicated at 11, to stiffen the same, and may be formed of relatively light gauge sheet metal. The brake lever 15 is pivoted thereupon as by means of the pin 16.

The ratchet portion consists of a separate plate 20, of heavier gauge than the supporting plate, secured at the lower edge of the supporting plate in such manner that its segmentally disposed teeth 21 are concentric with the pivot axis 16 of the lever. The upper portion of the ratchet plate is dovetailed, as indicated at 22, to interfit with a complementarily shaped opening 23 in the supporting plate. It is not necessary that these parts be secured together other than by the dovetail joint, inasmuch as lateral displacement of the ratchet plate is prevented by the lever 15, which, extending upon either side of the ratchet plate, effectively retains the latter against displacement. The ratchet plate may be separately hardened, and provides a more massive and rigid toothed area than would be possible otherwise in an economically feasible construction.

The body of the lever is substantially U-shaped in cross section and houses the elongated pawl member 25, which is formed of sheet metal of sufficient thickness to substantially fill the space between the side webs of the lever, and extends downwardly to operative engagement with the finger piece 30. The pawl is additionally guided and braced at its upper end by a plurality of tongues, 26, struck inwardly from one of the side webs. These serve not only as guides, but as abutments to take the reaction of the force exerted upon the lever through the pawl means when the brakes are locked in set position. Suitable connecting means such as the cable 28 connects the lever to the brakes or other controlled apparatus. The cable is attached to the lever by means of a clevis 29.

The elongated pawl 25 will be seen to move substantially radially, and to extend downwardly to a point adjacent the hand grip portion 18 of the lever, where it is so connected to a pivoted finger piece 30 as to be actuatable to released position by inward movement of the finger piece toward the hand grip portion, which movement is easily and naturally effected by the first finger of an operator grasping the hand grip portion. The hand grip portion is wider than the remainder of the lever, and the finger piece is pivoted therein upon a pin 31. The finger piece is also substantially U-shaped in cross section and of approximately the same thickness as the upper portion of the lever, and slidably receives the lower end of the pawl, which extends downwardly thereinto. The finger piece is normally urged outwardly with respect to the hand grip section of the lever by means of a spring 33, which reacts against a tongue 34 struck inwardly from the sheet metal of which the finger piece is formed. The spring is retained between such tongue and a cooperating downwardly directed spring-retaining projection 36 formed upon the lower end of the pawl member 25. The pawl member is slotted at 35 to slidably overengage and be guided by the pin 31. The spring 33 urges the pawl toward and returns it to engaged position, and at the same time serves to project the finger piece 30. The forwardly directed tongue 38, also integral with the lower end of the pawl member, projects into a slot 40 in the front of the finger piece. As shown in Figure 2, the slot is somewhat longer than the tongue, to allow vertical movement of the pawl as it rides over the teeth without imparting motion to the finger piece, as the lever is pulled back toward set position. In order to reinforce the upper edge of the slot, which bears downwardly against the pawl to release the same when the finger piece is pressed, the slot is preferably formed by pressing a downwardly directed tongue-like section from the finger piece, and folding the same back upwardly inside the finger piece, as indicated at 41, thereby providing a double thickness of the metal at that portion which bears against the pawl. Outward movement of the finger piece is limited by the tongue portion 42, which extends downwardly inside the hand grip portion, below the slot 17 in the hand grip portion through which slot the finger piece projects.

The spring 33 will be seen to be so mounted that it not only tends to rock the finger piece outwardly to the projected position, and force the pawl upwardly to the locked position, but exerts a slight lateral component upon the pawl member 25, tending to urge its lower end toward the right, as viewed in Figure 2, sufficiently to maintain it against the pin 31, and to prevent rattling of these parts. The same spring also takes up all lost motion between the finger piece, pin 31 and the lever, between the pawl and ratchet, between the pawl and lever, between the ratchet 20 and its supporting plate 10, and between the lever itself and the fulcrum pin 16. This single spring therefore serves not only as an operating spring for all of the operating parts, but to take up all lost motion between all movable parts of the assembly.

The modified construction shown in Figures 6 to 9 inclusive incorporates similar elongated sheet metal pawl means 25A, and a similarly acting and similarly interconnected finger piece 30A cooperating therewith, these parts being urged toward their engaged and projected positions respectively by a similar combined actuating and take-up spring 33A. The lever 15A is also of generally hollow, tubular sheet metal form, fulcrumed at its upper end upon a pin 16A carried by a supporting plate 10A attached to the vehicle. In this embodiment the supporting plate is shown as elongated to extend between the dash panel 14A and instrument panel 13A, to both of which it is attached, as by means of undesignated rivets, or other suitable means.

The toothed rack plate 20A is also dovetailed into the supporting plate, but it will be seen that it is provided with gear teeth rather than conventional ratchet teeth, the gear teeth being concentrically disposed about the pin 16A. Cooperating with the rack plate 20A is a pinion 24A, journaled on the lever in position to roll along the rack teeth as the lever is swung. A pinion and a cooperating ratchet plate 21A are fastened together to turn as a unit, and journaled upon the hollow rivet 27A, or other suitable support. The ratchet teeth cooperate with the upper end of the pawl member 25A, which will be seen to be retained against one wall of the interior of the lever, such wall taking the reaction exerted upon the pawl when the brakes are set, while escape of the pawl in the opposite direction is prevented by an in-struck tongue 26A. Since the ratchet plate is larger than the pinion, the pressure exerted upon the pawl is correspondingly reduced, and the latter may be made of thinner gauge metal than is possible in the embodiment first described, assuming that a given strength is to be provided. As indicated at 32A, wave-like laterally offset portions may be provided in the pawl member to take up all clearance between it and the interior of the lever, which clearance would otherwise exist by reason of the thinner gauge of the pawl member. The ratchet plate may be of material of corresponding gauge.

By reason of the reduction of pressure effected in the manner indicated, release of the pawl when the brakes are set hard is considerably eased. It will also be noted that the peripheral speed of the ratchet plate, being considerably multiplied, a greater number of teeth, which move more rapidly in proportion to the lever, can be incorporated. The teeth, while of substantial size and strength, act, in effect, to provide for very finely graduated positions at which the lever may be set, the action in this respect being as if the teeth were much finer than they actually are, despite the fact that their size, and accordingly the security with which they hold the pawl are not reduced.

In this embodiment the spring 33A acts similarly upon the finger piece and pawl portions to take up all clearance between them and between these parts and their mounting means, as well as to maintain them in the normal positions which they occupy when the pawl is locked and the finger piece projected, and it will further be seen that, under the influence of the spring, the ratchet plate 21A is urged upwardly and somewhat to the right, as viewed in Figure 7, to take up all clearance in the journal as well as between the pinion and rack plate, between the rack plate and supporting plate, and between the lever and pivot.

In the further modification shown in Figures 10-14 inclusive, the ratchet plate, 20B, is of segmental form, and of heavier gauge than the bracket plate 10B by which it is carried, and to which it is secured by means of the rivets 22B. The hand lever is also substantially U-shaped in cross section, and houses the pawl 25B, which is of the more conventional pivoted type, and which also may be of heavy gauge metal, corresponding to that of the ratchet plate. The trigger 30B is pivoted upon the same pin 31B upon which the pawl is mounted, the trigger member also being of channel form and facing in the opposite direction, to complete the enclosure of the space within the lever, except at the upper end. Separate springs, 33B, 33C, act upon the pawl and the trigger respectively, to maintain the pawl in yieldable engagement with the ratchet, and to urge the trigger outwardly to the position it occupies when the pawl is engaged. An arm of the pawl will be seen to project downwardly to a position adjacent the trigger in such manner that when the trigger is drawn toward the lever, the pawl will be rocked upon pin 31B to free the pawl from the ratchet teeth and allow unrestricted movement of the lever in both directions.

A slight lost motion exists between the trigger and the pawl when these elements are in the normal positions in which they are held by their spring means 33C, 33B. The clearance thus provided is designated 50, and will be seen to eliminate all possibility of unwanted engagement between the pawl and trigger such as might cause noise or vibration. Thus rattling is prevented when the parts are at rest and no motion or vibration is imparted to the trigger as the pawl rides over the teeth when the lever is pulled back without depressing the trigger.

The brake rod 28B, or other connecting means to the actuated mechanism, is attached, by means of clevis 29B, to a pin 27B which extends through a slot (undesignated) in the pawl, the slot providing sufficient clearance to permit unrestricted rocking of the pawl during its operative movements.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

I claim:

1. In a control lever construction, in combination with a ratchet, a lever pivoted adjacent the ratchet and having pawl means coacting therewith, said lever being of hollow sheet metal construction and said pawl means comprising an elongated metallic member movable longitudinally within and lying against one inside face of the lever, one end of the pawl when so moved being actuable to and from operative engagement with the ratchet, means adjacent the free end of the lever for actuating said pawl means, and guiding portions struck inwardly from said inside face of said lever to guide said pawl means.

2. In a lever-type control assembly, in combination with a ratchet, a hollow lever pivoted adjacent said ratchet, pawl means carried by the lever and adapted to coact with the ratchet to restrain unwanted movement of the lever, said pawl means comprising an elongated relatively stiff metallic member movable longitudinally within the lever to carry the inner end thereof into and from engagement with said ratchet, guiding means adjacent the inner end of the lever for controlling movement of said pawl means and preventing unwanted deflection thereof under loading, a finger piece carried by said lever nearer the outer end thereof and near the outer end of said pawl means including a pin, means for supporting and guiding said finger piece for independent movement with respect to said lever, said pawl means being at least partly guided by said same pin, and a driving connection between said finger piece and pawl means.

3. In a lever-type control assembly, in combination with a ratchet, a hollow lever pivoted adjacent said ratchet, pawl means carried by the lever and adapted to coact with the ratchet, to restrain unwanted movement of the lever, said pawl means comprising an elongated metallic element movable longitudinally within the lever to carry the inner end thereof into and from engagement with said ratchet, a finger piece carried by said lever nearer the outer end thereof and near the outer end of said pawl means, means for supporting and guiding said finger piece comprising a pivot pin upon which said finger piece is swingable, the outer end of said pawl means being slidably interengageable with and guided by said pin, and driving means interconnecting said finger piece and pawl means at a point spaced from said pin.

4. In a lever-type control assembly, in combination with a ratchet, a hollow lever pivoted adjacent said ratchet, pawl means carried by the lever and adapted to coact with the ratchet, to restrain unwanted movement of the lever, said pawl means comprising an elongated metallic element movable longitudinally within the lever to carry the inner end thereof into and from operative engagement with said ratchet, a finger piece carried by said lever nearer the outer end thereof and near the outer end of said pawl means, means for supporting and guiding said finger piece comprising a pivot pin upon which said finger piece is swingable, the outer end of said pawl means being slidably interengageable with and adapted to be guided by said pin, driving means interconnecting said finger piece and pawl means at a point spaced from said pin, means limiting swinging movement of the fingerpiece, and common spring means reacting against said pawl means and finger piece to yieldably maintain the pawl means in engagement with the ratchet and to swing said finger piece to one extreme of its normal movement.

5. In a lever-type control assembly, in combination with a ratchet, a hollow lever pivoted adjacent said ratchet, pawl means carried by the lever and adapted to coact with the ratchet, to restrain unwanted movement of the lever, said pawl means comprising an elongated metallic element movable longitudinally within the lever to carry the inner end thereof into and from operative engagement with said ratchet, a finger piece also of hollow construction carried by said lever nearer the outer end thereof and near the outer end of said pawl means, means for supporting and guiding said finger piece comprising a pivot pin upon which said finger piece is swingable, the outer end of said pawl means being slidably interengageable with and adapted to be guided by said pin and also projecting into the interior of said finger piece, said finger piece and pawl means having interengaging driving means located at a point spaced from said pin, whereby the pawl means may be actuated by the finger piece, spring means stressed between and reacting against said finger piece and pawl means, and yieldably urging said finger piece to a position in which it projects from said lever for convenient swinging movement by an operator of the lever, said spring means also reacting longitudinally against said pawl means to yieldably maintain the same in engagement with the ratchet.

6. Means as set forth in claim 4 in which said pin is aligned with the path of movement of the pawl means, and said spring means comprises a compression spring offset with respect to said path of movement but reacting at one end longitudinally against said pawl means, and at the other end reacting against said finger piece upon one side of said pin, said driving connection between the finger piece and pawl means being located upon the opposite side of said pin.

7. Means as set forth in claim 5 in which said spring means is housed in said finger piece.

8. In a lever-type control assembly, in combination with a support and a lever swingably carried thereby, a ratchet element having circumferentially disposed teeth and rotatably carried by said lever, pawl means also carried by said lever and coacting with said teeth, trip means for selectively controlling engagement of said pawl means, gear means for turning the ratchet element in response to swinging movement of the lever with respect to the support, said gear means being adapted to be locked against movement and to restrain swinging movement of the lever when said ratchet element is held by the pawl means, said ratchet element being journaled on said lever near the fulcrumed end thereof, said gear means including a gear secured to and adapted to turn as a unit with said ratchet element, a rack having segmentally disposed teeth carried by said support and meshing with said gear, said pawl means including a portion engageable with said teeth and movable longitudinally substantially in a direction toward and from the fulcrum of the lever, a finger piece for actuating said pawl means also movable with respect to the lever, and spring means reacting against both the pawl means and the finger piece and urging the pawl means against the ratchet element and thereby also urging the gear toward the ratchet and the lever outwardly away from its fulcrum.

WALTER S. SAUNDERS.